(12) United States Patent
Pombo et al.

(10) Patent No.: US 11,940,627 B2
(45) Date of Patent: Mar. 26, 2024

(54) OPAQUE WAVEGUIDE OPTICAL ENGINE ASSEMBLY FOR HEAD-MOUNTED DEVICE

(71) Applicant: RealWear, Inc., Vancouver, WA (US)

(72) Inventors: Stephen Pombo, Campbell, CA (US); Christopher Parkinson, Richland, WA (US)

(73) Assignee: RealWear, Inc., Vancouver, WA (US)

( * ) Notice: Subject to any disclaimer, the term of this patent is extended or adjusted under 35 U.S.C. 154(b) by 137 days.

(21) Appl. No.: 17/538,712

(22) Filed: Nov. 30, 2021

(65) Prior Publication Data
US 2023/0010198 A1  Jan. 12, 2023

Related U.S. Application Data

(60) Provisional application No. 63/220,237, filed on Jul. 9, 2021.

(51) Int. Cl.
*G02B 27/01* (2006.01)
*G02B 27/09* (2006.01)
(Continued)

(52) U.S. Cl.
CPC ..... *G02B 27/0172* (2013.01); *G02B 27/0101* (2013.01); *G02B 27/0972* (2013.01);
(Continued)

(58) Field of Classification Search
CPC .............. G02B 27/017; G02B 27/0172; G02B 27/0101; G02B 27/0972;
(Continued)

(56) References Cited

U.S. PATENT DOCUMENTS 10,108,011 B2   10/2018   Nikkhoo
10,739,512 B2   8/2020   Eisenfeld et al.
(Continued)

FOREIGN PATENT DOCUMENTS

CN   112180606 A   1/2021

OTHER PUBLICATIONS

International Search Report and Written Opinion received for PCT Application No. PCT/US2022/028517, dated Aug. 16, 2022, 9 pages.
(Continued)

*Primary Examiner* — Tom V Sheng
(74) *Attorney, Agent, or Firm* — Shook, Hardy & Bacon L.L.P.

(57) ABSTRACT

A head-mounted computing device having a waveguide optical engine assembly is disclosed. The waveguide is enclosed in a housing to limit or minimize exposure of the waveguide to ambient light. Further, the waveguide optical engine assembly comprises a compact footprint by allowing the other components of the waveguide optical engine assembly, such as a microprojector, a prism assembly, and the like, to be placed behind a rear surface of the waveguide. In addition to the compact footprint of the waveguide optical assembly, the configuration of the waveguide optical assembly disclosed, allows for maximization of advantages provided by the waveguide as related to eye box and eye relief. Additionally, the power requirements of the waveguide are greatly reduced, which also results in a prolonged battery life powering the head-mounted computing device.

20 Claims, 7 Drawing Sheets

(51) Int. Cl.
*G02B 6/00* (2006.01)
*G02B 6/34* (2006.01)

(52) U.S. Cl.
CPC .............. *G02B 6/00* (2013.01); *G02B 6/34* (2013.01); *G02B 2027/0118* (2013.01); *G02B 2027/0123* (2013.01); *G02B 2027/0125* (2013.01); *G02B 27/017* (2013.01); *G02B 2027/0178* (2013.01)

(58) Field of Classification Search
CPC .... G02B 2027/0118; G02B 2027/0123; G02B 2027/0125; G02B 2027/0178; G02B 6/00; G02B 6/34
USPC ........................................................ 359/13
See application file for complete search history.

(56) References Cited

U.S. PATENT DOCUMENTS

| | | | | |
|---|---|---|---|---|
| 2012/0162549 | A1* | 6/2012 | Gao | G02B 27/283 |
| | | | | 359/651 |
| 2012/0200937 | A1* | 8/2012 | Totani | G02B 27/0172 |
| | | | | 359/631 |
| 2013/0188080 | A1 | 7/2013 | Olsson et al. | |
| 2014/0071539 | A1* | 3/2014 | Gao | G02B 27/0172 |
| | | | | 359/737 |
| 2015/0253573 | A1 | 9/2015 | Sako et al. | |
| 2016/0217327 | A1 | 7/2016 | Osterhout et al. | |
| 2017/0038579 | A1* | 2/2017 | Yeoh | G02B 6/10 |
| 2017/0299860 | A1* | 10/2017 | Wall | G02B 3/04 |
| 2017/0323615 | A1* | 11/2017 | Hazra | G06T 11/60 |
| 2018/0088325 | A1 | 3/2018 | Brown et al. | |
| 2018/0292654 | A1* | 10/2018 | Wall | H04N 9/315 |
| 2018/0372940 | A1* | 12/2018 | Ishii | G02B 27/0172 |
| 2019/0196205 | A1 | 6/2019 | Pierer et al. | |
| 2019/0196207 | A1 | 6/2019 | Pierer et al. | |
| 2019/0212563 | A1* | 7/2019 | Schultz | G02B 27/0081 |
| 2019/0227317 | A1 | 7/2019 | Trail et al. | |
| 2019/0333480 | A1* | 10/2019 | Lang | G06F 3/011 |
| 2020/0018968 | A1 | 1/2020 | Edwin et al. | |
| 2020/0111259 | A1 | 4/2020 | Sears et al. | |
| 2020/0192088 | A1 | 6/2020 | Yu et al. | |
| 2020/0201047 | A1* | 6/2020 | Nakamura | G02B 6/0018 |
| 2020/0310136 | A1* | 10/2020 | Yang | G02B 6/0066 |
| 2020/0348518 | A1 | 11/2020 | Georgiou et al. | |
| 2020/0371357 | A1 | 11/2020 | Choi | |
| 2021/0018752 | A1* | 1/2021 | Sheng | G02B 6/0018 |
| 2021/0033867 | A1 | 2/2021 | Luo et al. | |
| 2021/0072437 | A1 | 3/2021 | Singh et al. | |
| 2021/0103146 | A1 | 4/2021 | Travers et al. | |
| 2021/0149203 | A1 | 5/2021 | Chen et al. | |
| 2021/0149206 | A1 | 5/2021 | Tiffin et al. | |
| 2021/0247608 | A1 | 8/2021 | Eisenfeld et al. | |
| 2022/0128817 | A1 | 4/2022 | Singh et al. | |
| 2022/0299764 | A1 | 9/2022 | Adema et al. | |
| 2022/0357499 | A1* | 11/2022 | Danziger | G02B 27/0018 |

OTHER PUBLICATIONS

International Search Report and Written Opinion received for PCT Application No. PCT/US2022/028522, dated Aug. 30, 2022, 10 pages.

Notice of Allowance dated Sep. 20, 2023 in U.S. Appl. No. 17/552,338, 8 pages.

Non-Final Office Action dated Jul. 18, 2023 in U.S. Appl. No. 17/552,338, 9 pages.

\* cited by examiner

OPAQUE WAVEGUIDE OPTICAL ENGINE ASSEMBLY FOR HEAD-MOUNTED DEVICE

CROSS-REFERENCE TO RELATED APPLICATIONS

This application claims priority to U.S. Provisional Patent Application No. 63/220,237, filed Jul. 9, 2021, entitled "HOUSED AND CONVERTIBLE WAVEGUIDE ASSEMBLIES FOR HEAD-MOUNTED DISPLAY," which is assigned or under obligation of assignment to the same entity as this application, the entire contents of each application being herein incorporated by reference.

BACKGROUND

A head-mounted computing device, also generally known as a head-mounted display or "HMD," enables users to mount a mobile computing device on or around their head, facilitating the transport and utilization of advanced computing technologies with greater ease and flexibility. HMDs also enable a user to have interaction with the technology while otherwise remaining engaged in other tasks. For instance, HMDs can be voice activated and hands-free, so that users can focus on other more "physical" tasks, or simply when they desire a more hands-free computing experience.

The displays for HMDs are conventionally microdisplays such as, for example, liquid crystal display (LCD), liquid crystal on silicon (LCOS), organic light emitting diodes (OLED), dot matrix display (DMD), and the like, coupled with refractive optics. This combination produces an HMD that may have a smaller-than-desired eye relief, eye box, and field of view.

SUMMARY

Embodiments of the present invention relate to a HMD that overcomes the limitations of previous HMDs by providing a HMD with a waveguide optical engine assembly including a microprojector (such as a digital micromirror device DMD projector) paired with a waveguide such as the waveguides available from WaveOptics®. Waveguides, which are generally clear or transparent (i.e. see through), have superior eye relief, eye box and fields of view when compared to conventional optics, which allows them to be used in virtual reality applications that allows a user to view images through (i.e. projected onto) the waveguide to appear as if they are part of the real world environment(s), also known as augmented reality (AR).

The waveguide optical engine assembly for the HMD in accordance with aspects herein, in addition to having a microprojector coupled to a waveguide, it also includes a prism for projecting a source image projected by the microprojector to the waveguide. The microprojector, the waveguide and the prism of the waveguide optical engine assembly are all enclosed within an opaque housing. This enclosed configuration allows for reduction of volume and improved energy efficiency by preventing environmental light from interfering with an image projected onto the waveguide. In other words, the energy requirements of the waveguide are greatly reduced because the brightness of the waveguide does not have be adjusted to compensate for environmental lighting so that image quality is not sacrificed. Further, the enclosed configuration of the waveguide optical engine assembly affords the HMD disclosed herein to have improved field of view, eye relief distance, and eye box. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, head-mounted computing devices (also referenced herein as "HMDs") allow users to mount mobile computing devices on or around their head, enabling the user to transport and utilize advanced technologies with greater ease and flexibility, and allowing a user to have interaction with the technology while otherwise remaining engaged in other tasks. The microdisplays for conventional HMDs can traditionally include LCD, LCOS, OLED, DMD, and the like. Traditional microdisplay technologies, however, often require a relatively large footprint that is not desirable for head-mounted applications. In addition, the conventional microdisplay technologies can have a limited eye box and eye relief, which requires the HMD to be in a fixed position relative to a wearer's sightlines in order for the user to view a clear image. Additionally, other disadvantages of the conventional microdisplay technologies can include rapid battery drain, particularly with continuous or constant utilization.

On the other hand, some HMDs, such as those typically utilized in AR applications, utilize waveguides that generally have transparent, light weight bodies, and are generally known to utilize less energy than conventional microdisplay technologies, have larger fields of view, more extensive eye relief, and provide larger eye boxes for users/viewers. Also, as waveguides generally have a smaller footprint (e.g., thinner, lighter) than conventional microdisplays, which makes them ideal for HMD applications.

Aspects disclosed herein allow waveguides traditionally used in only AR applications to be used in non-AR environments. This is achieved by enclosing the waveguide into a housing made of opaque materials so that an opaque background is provided for the waveguide, thereby essentially making the waveguide opaque or non-transparent. This configuration also allows for reducing the footprint of the waveguide optical engine assembly because the microprojector and prism can be overlapped with the waveguide (placed behind the waveguide), which is desirable in HMD applications. The housing is configured to substantially enclose the waveguide optical engine assembly. In other words, at least 80%, 85%, 90%, 95%, or 100% of a rear side of the waveguide optical engine assembly is enclosed such that limited to no environmental light can pass through the rear side of the waveguide. In accordance with embodiments described herein, environmental light can include any light source that is not generated by a light projecting device coupled to the waveguide. In this regard, the opaque housing prevents the passage of environmental light through the rear portion of the waveguide. To this end, when the housed or covered waveguide is utilized to display an output provided for display from, for example, the microprojector, or from a processing device coupled thereto, the waveguide in accordance with the disclosed embodiments provides clear images with optimized eye box requires less power and thus extends HMD battery life because the amount of light required to illuminate and view the covered or housed waveguide is significantly less than is typically required in unenclosed waveguide applications, i.e., transparent waveguide applications. In addition, the waveguide optical engine assembly having the housed waveguide retains all the known benefits of waveguides such as larger field of view, eye relief distance, and eye box.

Figure 1:
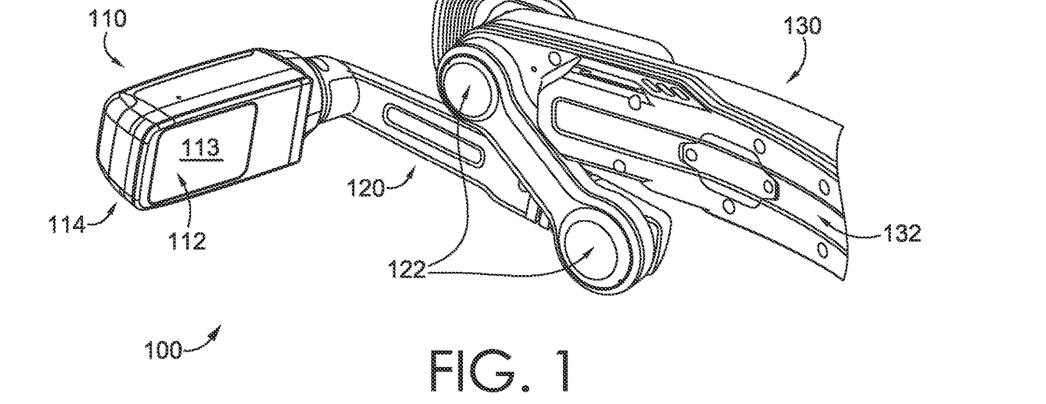
FIG. 1 is an illustration of a waveguide optical engine assembly coupled to a boom arm of a head-mounted computing device in accordance with an embodiment of the present invention.
Figure 2:
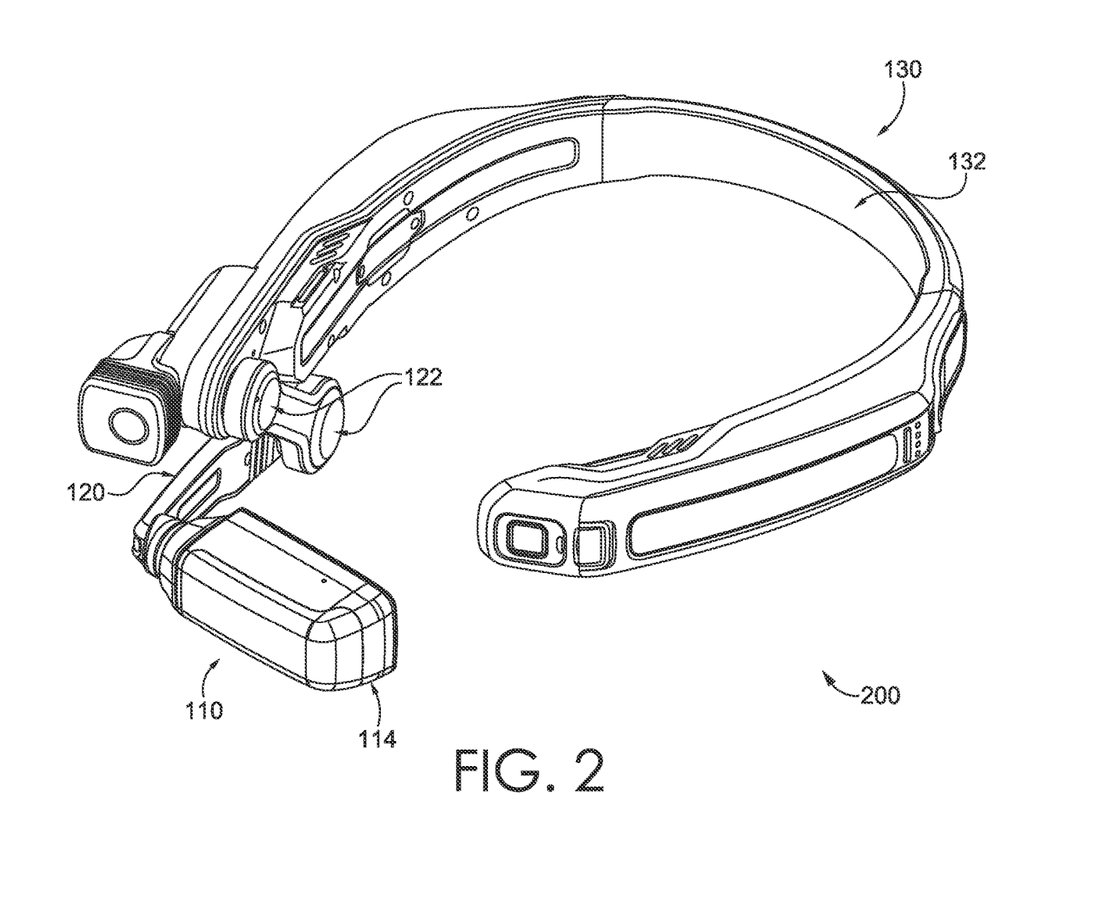
FIG. 2 is an illustration of a head-mounted computing device having a waveguide optical engine in accordance with some embodiments of the present invention.

Various embodiments of a head-mounted computing device 130 are depicted in FIGS. 1-9, provided herein. Specifically, FIG. 1 depicts a right perspective view 100 of a right-side portion of a waveguide optical engine assembly 110. By way of non-limiting example, the HMT-1 from RealWear, Inc. headquartered in Vancouver, WA, is a head-mounted computing device that can be referenced and implemented in accordance with some embodiments of the present disclosure. FIG. 2 depicts a front perspective view 200 of the head-mounted computing device 130 in accordance with some of the described embodiments. With reference to both FIGS. 1 and 2, the head-mounted computing device 130 can include a waveguide optical engine assembly 110 and a boom arm 120, whereby the waveguide optical engine assembly 110 can be mounted to the head-mounted computing device 130. As shown in FIG. 1, the user facing portion of the waveguide optical engine assembly 110, comprises a display surface 113 that exposes a portion of the waveguide 112. The boom arm 120, as shown, comprises articulating joints 122 that allows the user to adjust a position of the waveguide optical engine assembly 110 with respect to a sightline of the user when the head-mounted computing device 130 is mounted on the user's head or the user's head gear. However, the boom arm 120 is only exemplary and it is also contemplated that the boom arm my only have one articulating joint, or have more than two articulating joints, or have no articulating joints, without departing from aspects disclosed herein. The head-mounted computing device can be mounted and secured onto the user's head or onto the user's head gear through a resilient support 132. Different types of headwear can include, among other things, a baseball hat, helmet, a bump cap, a visor, a stocking cap, an elastic band or tri-band, or any other form-factor of headwear that can be worn on the head of a user.

In accordance with aspects herein, a waveguide optical engine assembly 110 can be fixedly and/or movably attached to, a head-mounted computing device 130. The head-mounted computing device 130 can include, by way of non-limiting example, any headwear that is adapted to receive the head-mounted computing device 130 having the waveguide optical engine assembly 110. In some embodiments, the resilient support 132 can include an arcuate band made of plastic or rigid yet flexible materials shaped to span from one side of a user's head, over a top of the user's head, and/or to another side of the user's head. In another example embodiment, the resilient support 132 can extend around a circumference of the user's head, extending around the forehead, around one side, around a back side, and/or around a second side of the user's head.

Furthermore, the boom arm 120 of the head-mounted computing device 130 can selectively or fixedly extend the waveguide optical engine assembly 110 forward of a user (i.e., a wearer of head-mounted computing device 130) to align the waveguide optical engine assembly 110 in front of one or more of the user's eyes via the articulating joints 122. The articulating joints 122 for pivoting, extending, or otherwise adjusting a location of the waveguide optical engine assembly 110 relative to a user in various as-worn configurations. In some embodiments, as described herein, the boom arm 120 can be integrally formed with a housing 114 that encloses the waveguide optical engine assembly 110 and various other electronic components of the head-mounted computing device 130.

Figure 3:
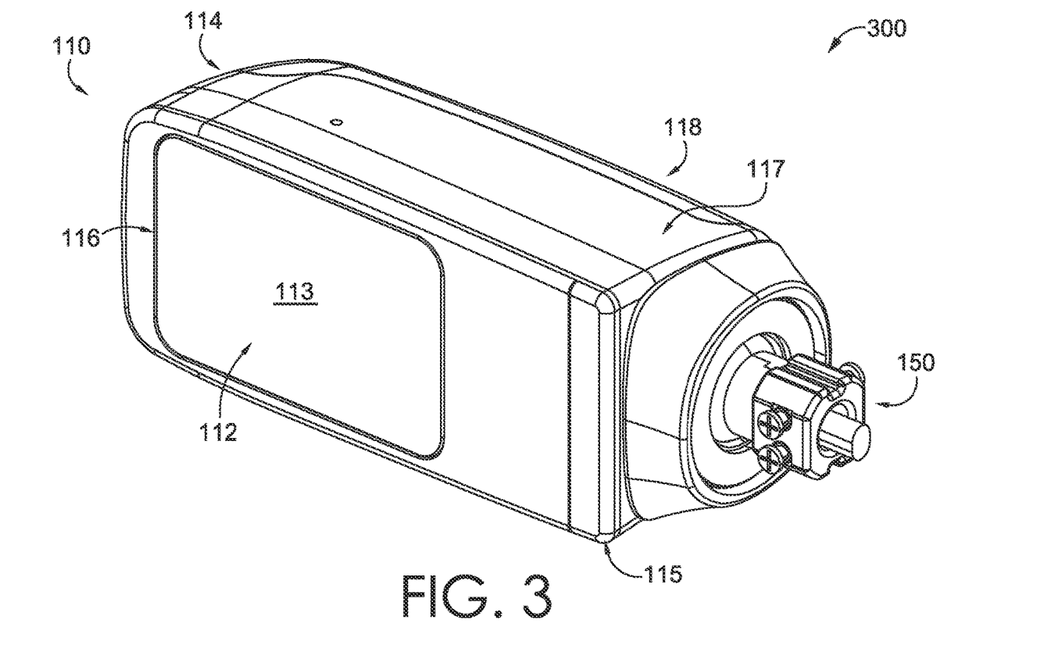
FIG. 3 is a front view of a waveguide optical engine assembly in accordance with some embodiments of the present invention.

Continuing onto FIG. 3, FIG. 3 depicts a front perspective view 300, or in other words a "display-side view," of a waveguide optical engine assembly 110 enclosed within housing 114 in accordance with embodiments of the present invention. At a high level, the housing 114 enclosing the waveguide optical engine assembly 110 has a generally rectangular cuboid shape (as shown), though other shapes for either the housing 114 or display surface 113 are contemplated as being within the scope of the present disclosure. The housing 114 can include a face plate 115 (i.e., user-facing) that partially covers a front side of the waveguide 112, exposing a front side of the waveguide 112 through a void 116, thereby forming the display surface 113 of the waveguide 112.

Figure 4:
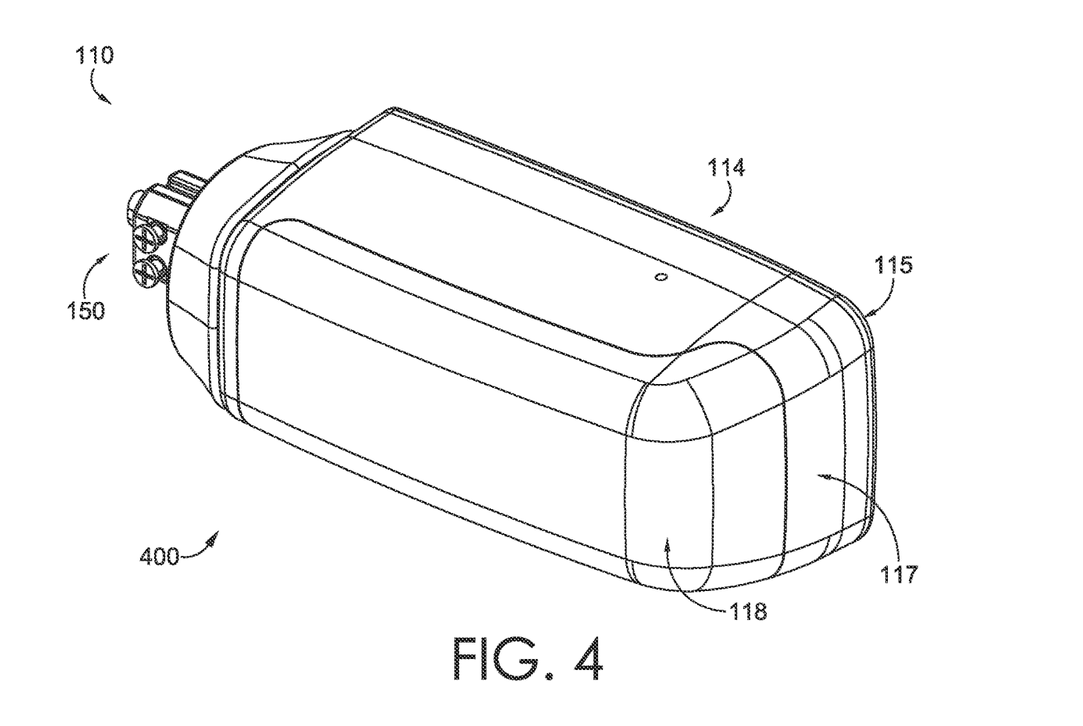
FIG. 4 is a rear view of a waveguide optical engine assembly in accordance with some embodiments of the present invention.

Continuing on with the figures, FIG. 4 depicts a rear perspective view 400, or in other words a rear or "backside" view, of the waveguide optical engine assembly 110 shown in FIG. 3, as enclosed within the housing 114. As shown in FIG. 4, the housing 114 can further include the mid-section 117 and an opaque back-plate 118 for completely enclosing the remaining components of the waveguide optical engine assembly 110 such as, for example, a microprojector, a prism, and the like. As further shown in FIGS. 3 and 4, the waveguide optical engine assembly 110 connects to the boom arm 120 of the head-mounted computing device 130 through a connection assembly 150.

Figure 5:
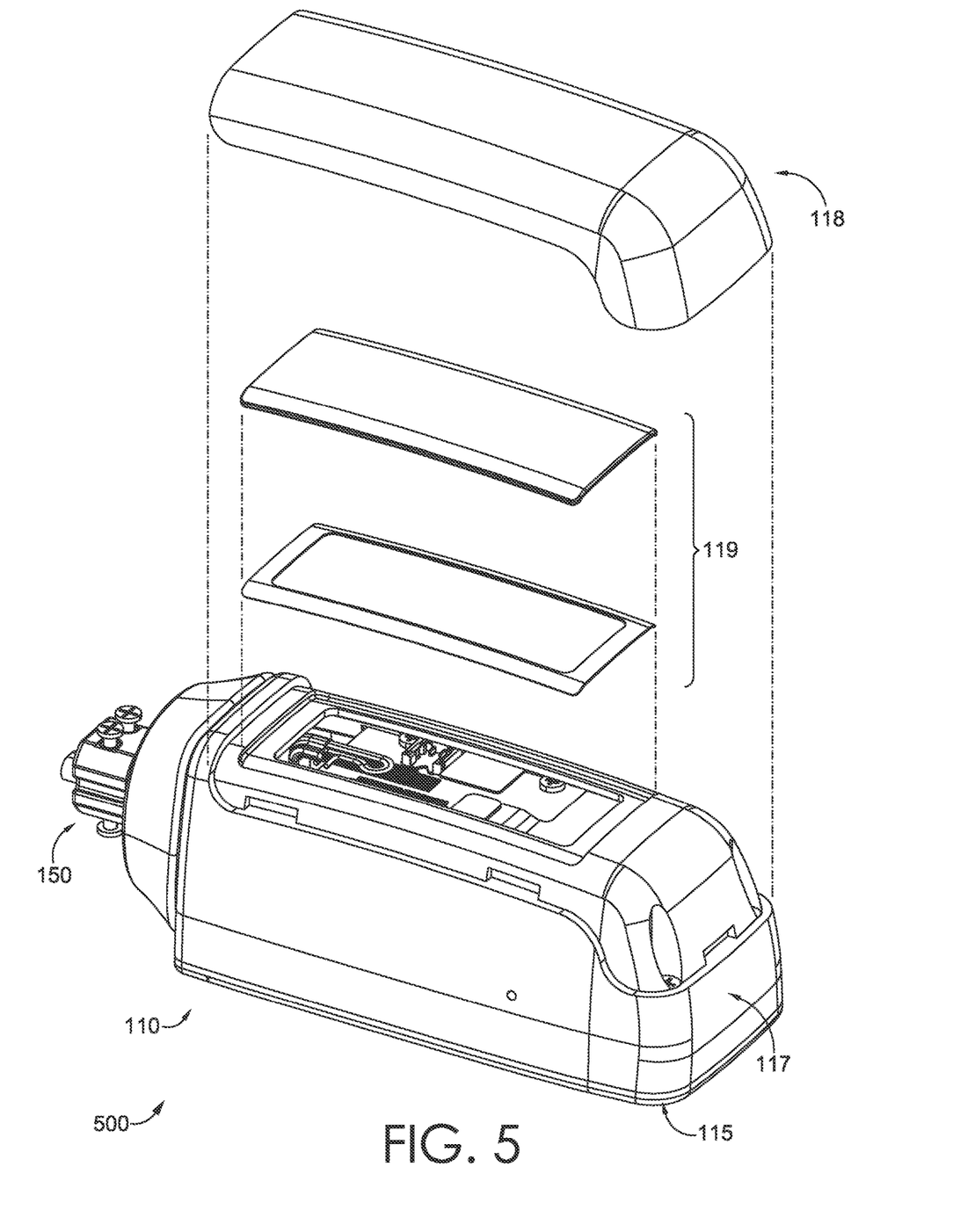
FIG. 5 is an exploded bottom perspective view of a waveguide optical engine assembly having a back-plate in accordance with some embodiments of the present invention.

Continuing onto FIG. 5, FIG. 5 depicts an exploded perspective view 500 of the waveguide optical engine assembly 110. As shown, the backside of the waveguide optical engine assembly 110 is provided with an opaque back-plate 118. In accordance with the illustrated embodiment, the opaque back-plate 118 can be removably attached to the waveguide optical engine assembly 110. Further, in some embodiments, the waveguide optical engine assembly 110 can further include additional back-plates 119, such as, for example, covers, gaskets, and the like, which can facilitate the enclosure of various internal components of the waveguide optical engine assembly 110 (e.g., microprojector, prism, waveguide, frame, circuitry, and the like).

Figure 6:
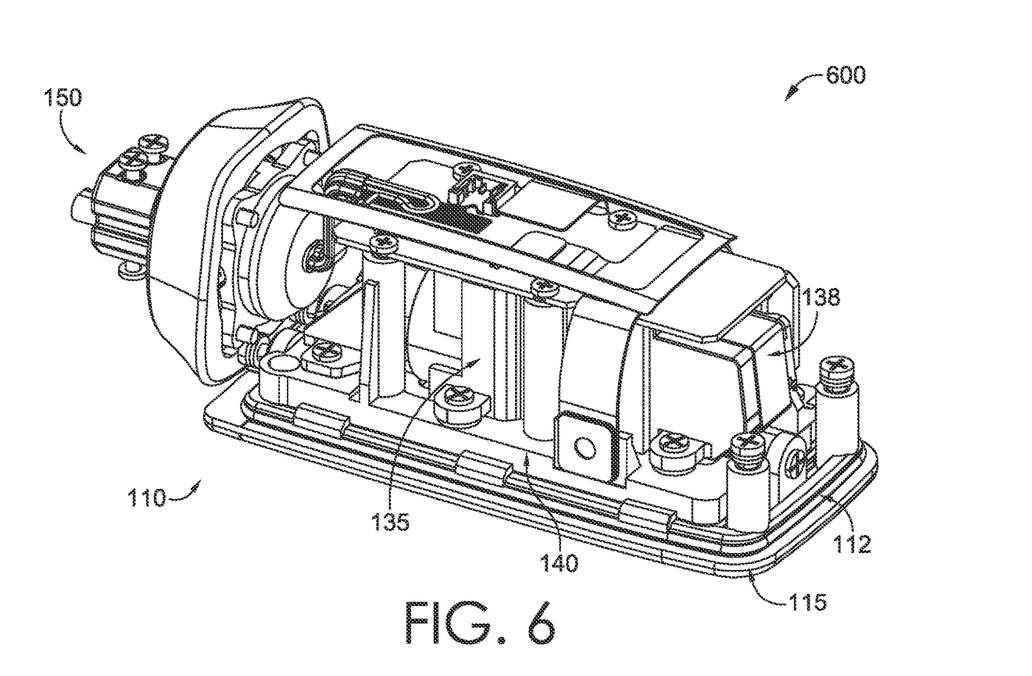
FIG. 6 is perspective view of a waveguide optical engine assembly having a housing mid-section and back-plate removed therefrom in accordance with some embodiments of the present invention.
Figure 7:
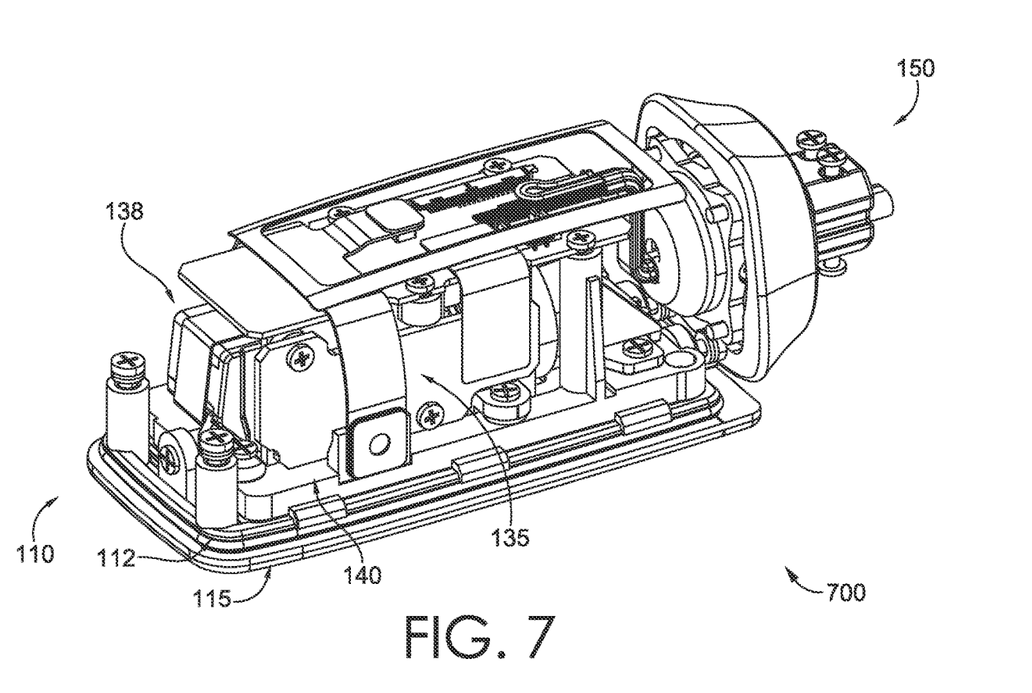
FIG. 7 is another perspective view of a waveguide optical engine assembly having a housing mid-section and back-plate removed therefrom in accordance with some embodiments of the present invention.

FIG. 6 depicts a perspective view 600 of the waveguide optical engine assembly 110 having the mid-section 117 and the opaque back-plate 118 of the housing 114 removed therefrom, thereby exposing various internal components of the waveguide optical engine assembly 110. FIG. 7 depicts an opposite perspective view 700 of the waveguide optical engine assembly 110, also having the mid-section 117 and opaque back-plate 118 of the housing 114 removed.

FIGS. 6 and 7, the internal components of the waveguide optical engine assembly 110 can include, among other things, a waveguide 112, a microprojector 135, a prism assembly 139, an assembly frame 140, a power source (not shown), and the like, where the microprojector 135 and the waveguide 112 are essentially coupled to each other by the prism assembly 139, as will be further described in more detail below. In the depicted embodiment, the assembly frame 140 is configured to receive and secure the various internal components of the waveguide optical engine assembly 110 relative to one another, as more clearly seen in the exploded view 800 shown in FIG. 8.

Figure 8:
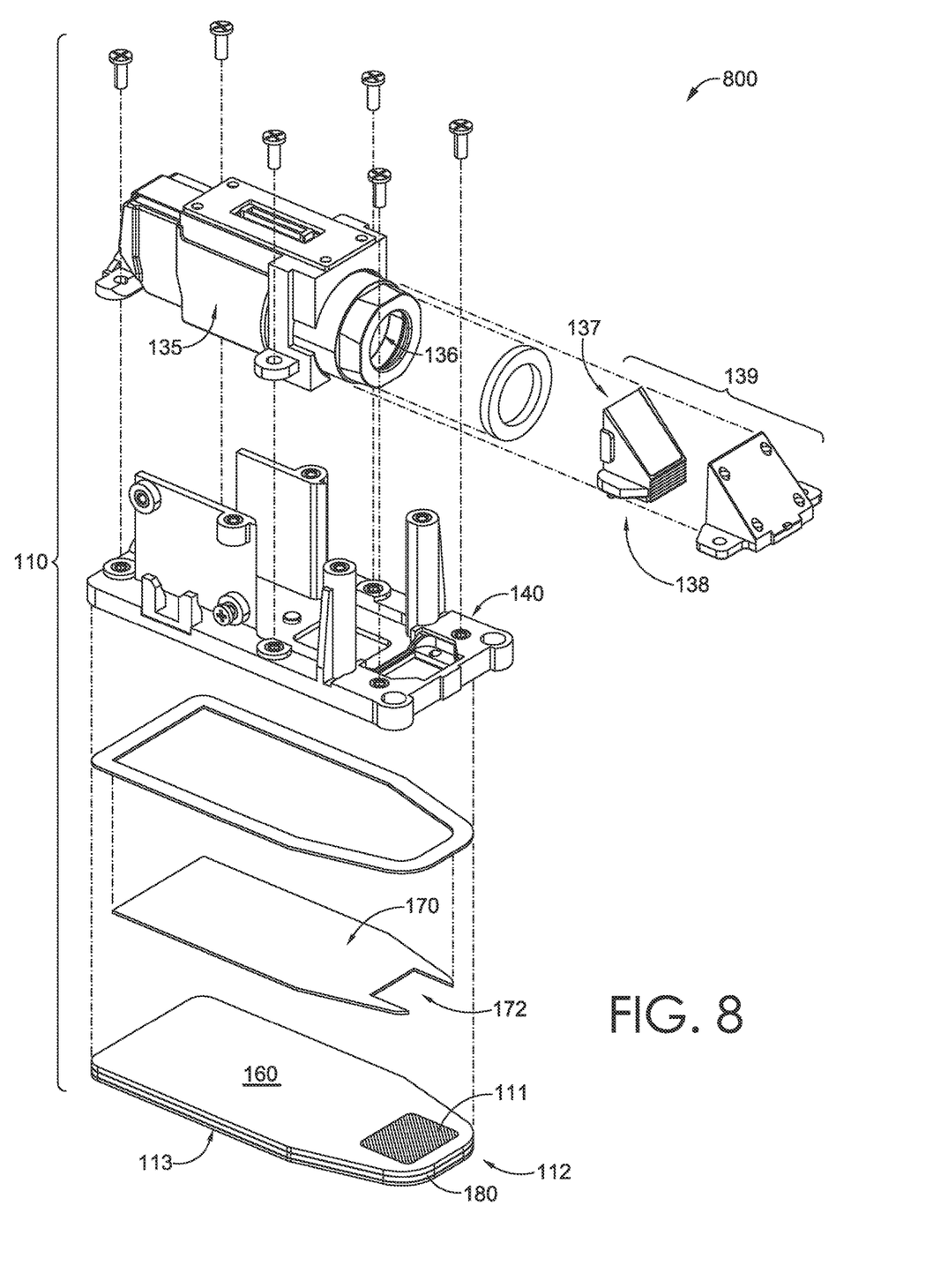
FIG. 8 is an exploded perspective view of a waveguide optical engine assembly having a housing removed therefrom in accordance with some embodiments of the present invention.

As shown in FIG. 8, the waveguide 112 by way of a non-limiting example, can be transparent having a display surface 113 and an opposite rear surface 160. The rear surface 160 of the waveguide 112 is equipped with an input portion 111, where the display surface 113 and the rear surface 160 are separated by a side or edge portion 180. The microprojector 135 is configured to project light and a source image (not shown) onto an input end 137 of the prism assembly 139. Then, an output end 138 of the prism assembly 139 is configured to reflect the light and the source image coming from the microprojector 135 onto the input portion 111 of the waveguide 112 so that the source image and light are amplified in the waveguide 112. As a result, a user is able to view the amplified source image with an optimal amount of brightness through the display surface 113 of the waveguide 112. An advantage of the waveguide optical engine assembly 110 is that image clarity of the source image is not deteriorated even when a position (i.e. distance from the eyes of the user and/or position with respect to a vertical axis running parallel to the user's height as measured from the user's head to the user's feet) of the waveguide optical engine assembly 110 is moved or changed with respect to the sightline of a user of the head-mounted computing device 130. This is because the waveguide 112 allows the waveguide optical engine assembly 110 to have a larger eye box and a wider range of eye relief when compared to conventional microdisplay technologies such as, for example, LCD, LCOS, OLED, DMD, and the like.

Further, in accordance with some aspects herein, the waveguide 112 of the waveguide optical engine assembly 110 may be made opaque by providing an opaque housing. Additionally, the waveguide 112 may be made opaque by further providing a light shield 170 to cover the rear surface 160 of the waveguide 112. The light shield 170 being configured to be opaque such that it is able to prevent light from passing through the waveguide. In some instances where the light shield 170 is provided, it is contemplated that the housing may optionally be made at least partially transparent, allowing a user to view internal components of the waveguide optical engine assembly 110 without sacrificing shielding of the rear surface 160 of the waveguide 112 from environmental light. As shown, the light shield comprises a notch 172 configured to allow exposure of the input portion 111 of the waveguide 112 to the output end 138 of the prism assembly 139. As provided above, making the waveguide 112 opaque allows for the waveguide 112 to amplify and display the source image to the user without having to compensate for ambient light, which is in turn also reduces energy requirements of the waveguide optical engine assembly 110. To this end, in further aspects, the waveguide optical engine assembly 110 may further comprise a brightness controller equipped with one or more sensors (not shown). The one or more sensors of the brightness controller may be configured to detect levels of ambient light, and the brightness controller may be adapted to reduce a brightness level of the projected light and source image coming from the microprojector 135 based on the levels of ambient light that the waveguide 112 is exposed to, which is greatly reduced or minimized in the waveguide optical engine assembly 110, as disclosed herein.

Figure 9:
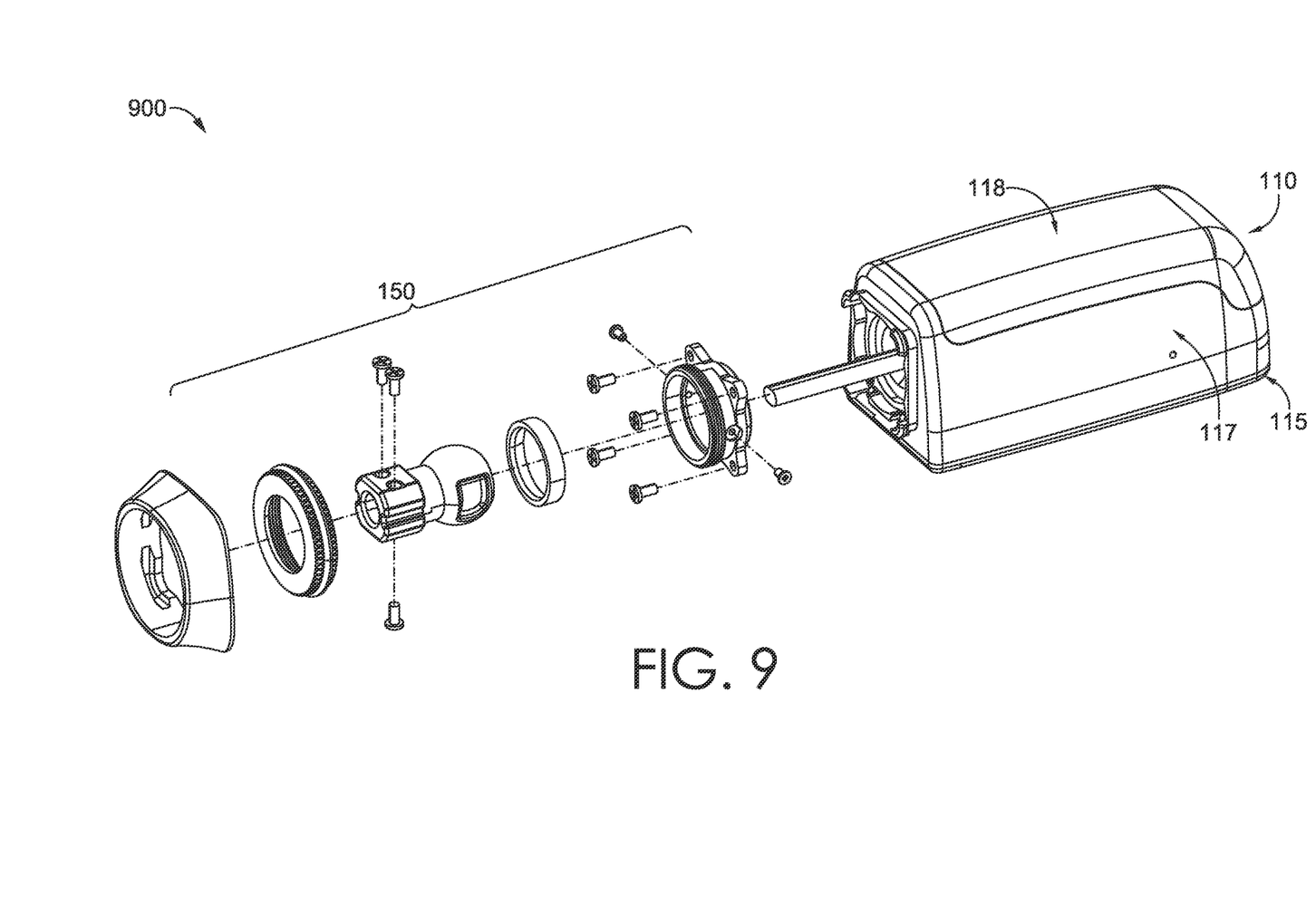
FIG. 9 is an exploded perspective view of a coupling assembly for coupling a waveguide optical engine assembly and a boom arm in accordance with some embodiments of the present invention.

In accordance with aspects herein, and as will be described in more detail in relation to FIG. 9, the waveguide optical engine assembly 110 can further include a ball joint or other type of connection assembly 150, which is configured to movably attach the waveguide optical engine assembly 110 to head-mounted computing devices such as head-mounted computing device 130. The connection assembly 150 can rotatably or pivotally attach the waveguide optical engine assembly 110 to head-mounted computing devices, such as boom arm 120 of head-mounted computing device 130, for adjustment of a location of the waveguide optical engine assembly 110 with respect to a face of a wearer of the head-mounted computing device 130. Additionally or alternatively, the connection assembly 150 can be fixedly couple the waveguide optical engine assembly 110 to head-mounted computing devices, such as the head-mounted computing device 130 of FIGS. 1-8. Specifically, FIG. 9 depicts an exploded perspective view 900 of the connection assembly 150 (e.g., ball joint) that rotatably or pivotally couples the waveguide optical engine assembly 110 to the boom arm 120 of the head-mounted computing device 130 for providing the ability to adjust a position of the waveguide optical engine assembly 110 with respect to a field of view of the wearer.

Further aspects disclosed herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 10:
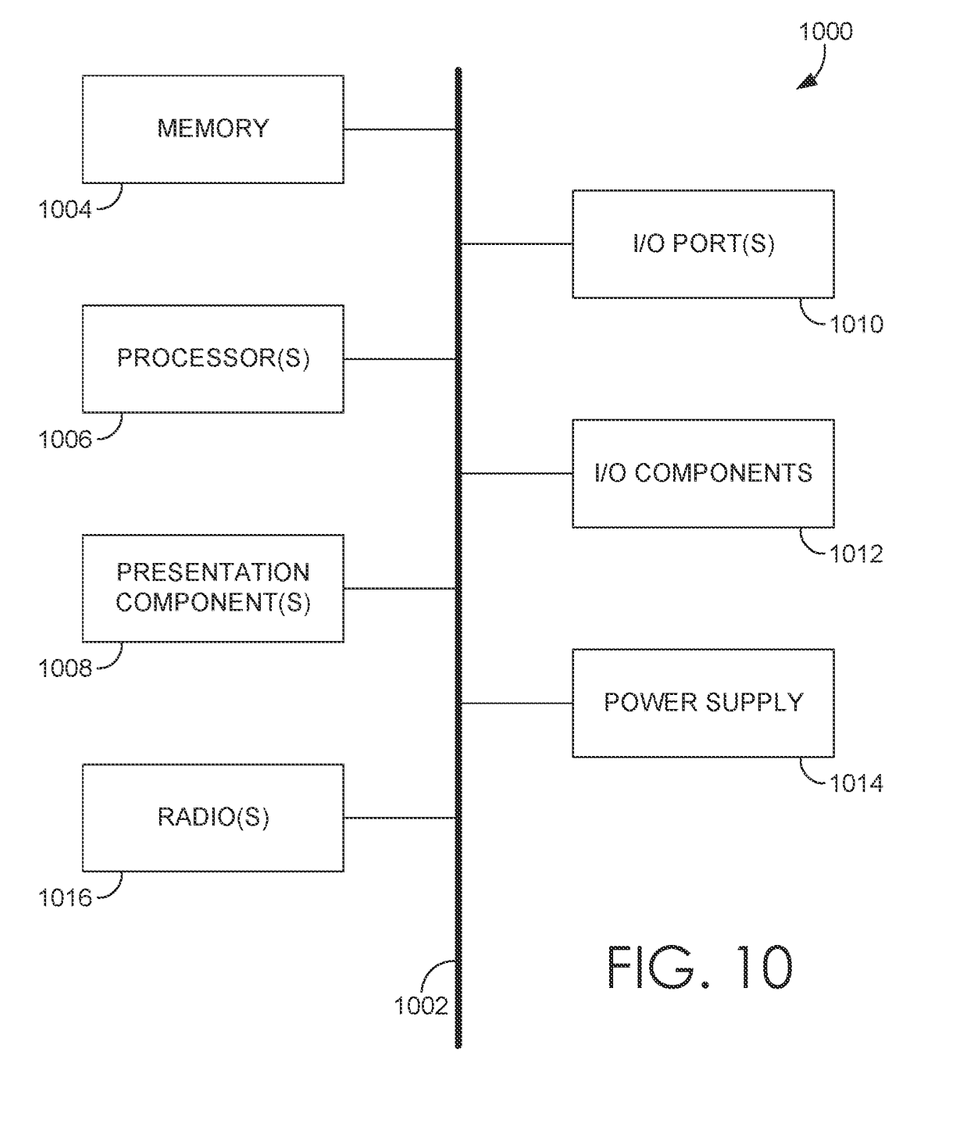
FIG. 10 is a block diagram of an exemplary computing environment suitable for use in implementing some embodiments of the present invention.

Referring to FIG. 10, an exemplary operating environment for implementing aspects disclosed herein, is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

As shown in FIG. 10, computing device 1000 may include a bus 1002 that directly or indirectly couples the following devices: memory 1004, one or more processors 1006, one or more presentation components 1008, input/output (I/O) components 1010, input/output components 1012, and an illustrative power supply 1014. Bus 1002 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," "portable computing device," and the like, as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by, for example, computing device 1000, shown in FIG. 10. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1004 includes computer-storage media in the form of volatile and/or nonvolatile memory. The memory may be removable, non-removable, or a combination thereof. Exemplary hardware devices include solid-state memory, hard drives, optical-disc drives, secure digital (SD) cards, micro SD cards, and the like. Computing device 1000 includes one or more processors that read data from various entities such as memory 1004 or I/O components 1010. Presentation component(s) 1008 present data indications to a user or other device. Exemplary presentation components include a display devices (e.g., the waveguide optical engine assembly 110, as shown in the figures), speakers, printing components, vibrating components, light components, and the like.

I/O components 1010 allow computing device 1000 to be logically coupled to other components of the computing device 1000, some of which may be built in. Illustrative components include a microphone, joystick, game pad, satellite dish, scanner, printer, wireless routers, bluetooth devices, and the like. The I/O components 1010 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1100 to render immersive augmented reality (AR) or virtual reality (VR).

The head-mounted computing devices in accordance with aspects herein, such as the head-mounted computing device 130, can be set up as or similar to, for example, the computing device 1000 shown in FIG. 10, which can be logically coupled to the waveguide optical engine assembly 110, a power source (i.e., battery or batteries, not shown), a camera, a microphone, and the like. The head-mounted computing devices and the waveguide optical engine assembly 110 are configured to display a visual output (e.g., image, video) communicated thereto, or stored therein. The arrangement of the waveguide optical engine assembly 110 provided with the light shield 170, as shown in FIG. 8, allows for reduced footprint by allowing the placement of the different computing components, I/O components, structural components, and/or power source components, immediately behind the waveguide 112, instead of a separate location on the head-mounted computing devices.

In accordance with further aspects disclosed herein, the head-mounted computing devices can include modules (e.g., hardware and/or software) adapted to adjust features of the waveguide optical engine assembly 110, such as power delivery, brightness, contrast, and the like. While such adjustable features may be typically connected to those of the microprojector 135, the present disclosure will reference the waveguide 112 as the affected component for purposes of simplifying the description. In accordance with various embodiments, the at least one processor or modules of the head-mounted computing devices can execute instructions stored in memory to decrease a default brightness and/or power capacity to be delivered to the waveguide 112 to adjust brightness by decreasing an amount of light needed to view a source image through waveguide 112. This is because the waveguide optical engine assembly 110 is configured to prevent environmental light from interfering with the visual output of the waveguide 112 (as environmental light typically would interfere in conventional use cases of a waveguide due to its transparent/translucent nature), as such, the arrangement of components of the waveguide optical engine assembly 110 in turn decrease certain power-hungry settings of the waveguide 112 in traditional (i.e., conventional) uses of the waveguide 112, resulting in an extended battery life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A waveguide optical engine assembly comprising:
a housing;
a waveguide having a display surface and a rear surface, the rear surface having an input portion;
a light shield configured to prevent light from passing through the light shield;
a microprojector configured to project a source image; and
a prism assembly adapted to transfer the source image projected from the microprojector to the input portion of the waveguide,
wherein the source image received by the input portion of the waveguide is displayed in the display surface of the waveguide,
wherein the light shield is positioned adjacent to the rear surface of the waveguide such that a portion of the rear surface is covered by the light shield, and
wherein the waveguide, the light shield, the microprojector, and the prism assembly are at least partially enclosed within the housing.

2. The waveguide optical engine assembly of claim 1, further comprising a brightness controller adapted to reduce a brightness level of the source image.

3. The waveguide optical engine assembly of claim 1, wherein the waveguide optical engine assembly is adapted for coupling to a boom arm of a head-mounted computing device.

4. The waveguide optical engine assembly of claim 3, wherein the display surface is configured to face at least one eye of a wearer when the head-mounted computing device is in an as-worn configuration.

5. The waveguide optical engine assembly of claim 3, wherein the waveguide optical engine assembly is rotatably or pivotably coupled to the boom arm through a connection assembly.

6. The waveguide optical engine assembly of claim 5, wherein the connection assembly comprises a ball joint.

7. The waveguide optical engine assembly of claim 3, wherein the boom arm comprises an articulating joint.

8. The waveguide optical engine assembly of claim 1, wherein the housing is opaque.

9. The waveguide optical engine assembly of claim 1, wherein the light shield is opaque.

10. The waveguide optical engine assembly of claim 1, wherein the microprojector, the prism assembly, and the light shield are positioned proximate the rear surface of the waveguide.

11. A head-mounted computing device comprising:
one or more memory devices storing one or more executable instructions;
one or more processors configured to execute the one or more executable instructions stored in the one or more memory devices;
a resilient support;
a power source; and a waveguide optical engine assembly comprising:
an opaque housing;
a waveguide comprising a display surface and an opposite rear surface, the opposite rear surface comprising an input portion and a non-input portion;
a light shield positioned adjacent to the opposite rear surface of the waveguide and covering the non-input portion;
a microprojector; and
a prism assembly,
wherein the waveguide, the light shield, the microprojector, and the prism assembly are at least partially enclosed within the opaque housing.

12. The head-mounted computing device of claim 11, wherein the waveguide optical engine assembly is coupled to the resilient support by a boom arm.

13. The head-mounted computing device of claim 12, wherein the boom arm comprises at least one articulating joint.

14. The head-mounted computing device of claim 11, wherein the waveguide optical engine assembly further comprises a light shield configured to continually or selectively prevent light from passing through the light shield, wherein the light shield is positioned alongside the opposite rear surface of the waveguide.

15. The head-mounted computing device of claim 11, wherein the prism assembly comprises an input end and an output end.

16. The head-mounted computing device of claim 15, wherein the prism assembly couples the microprojector to the waveguide by receiving a source image from the microprojector at the input end and reflecting the source image to the input portion of the waveguide through the output end for amplification of the source image by the display surface of the waveguide.

17. The head-mounted computing device of claim 11, wherein the waveguide optical engine assembly further comprises a brightness controller.

18. The head-mounted computing device of claim 11, wherein the microprojector and the prism assembly are positioned proximate the opposite rear surface of the waveguide.

19. The head-mounted computing device of claim 11, wherein the waveguide optical engine assembly is rotatably or pivotably coupled to a boom arm through a connection assembly.

20. The head-mounted computing device of claim 19, wherein the connection assembly comprises a ball joint.

* * * * *